P. E. CLARK.
TRANSMISSION GEARING.
APPLICATION FILED APR. 22, 1911.

1,011,746.

Patented Dec. 12, 1911.

2 SHEETS—SHEET 1.

Witnesses:

Inventor
Prentice E. Clark
by
Ennis L. Norris
Atty.

P. E. CLARK.
TRANSMISSION GEARING.
APPLICATION FILED APR. 22, 1911.

1,011,746.

Patented Dec. 12, 1911.

2 SHEETS—SHEET 2.

Witnesses:
Robert Everitt

Inventor
Prentice E. Clark

UNITED STATES PATENT OFFICE.

PRENTICE E. CLARK, OF ELKINS, WEST VIRGINIA.

TRANSMISSION-GEARING.

1,011,746.      Specification of Letters Patent.      Patented Dec. 12, 1911.

Application filed April 22, 1911. Serial No. 622,716.

*To all whom it may concern:*

Be it known that I, PRENTICE E. CLARK, a citizen of the United States, residing at Elkins, in the county of Randolph and State of West Virginia, have invented new and useful Improvements in Transmission-Gearing, of which the following is a specification.

This invention relates to improvements in transmission gearing for converting continuous rotary motion into alternating rotary motion, and it proposes a construction which is especially applicable in the organization shown in my U. S. Letters Patent No. 969601, of September 6, 1910, as a transmission unit between the continuously rotary main driving shaft and each of the machines operated thereby.

The gearing which forms the subject of the present invention proceeds along the principles of the gearing which forms the subject of my U. S. Letters Patent No. 951055, of March 1, 1910, but it involves a number of novel and substantial features of improvement which will be particularly pointed out as the description proceeds and which result in substantial advantages in the particular application referred to that cannot be secured by the particular construction shown in said Letters Patent No. 951055.

The object of the invention is to provide a transmission gearing of the type stated which shall be very compact and strong and of simple construction and light weight; and in these respects, the improved gearing presents substantial and material improvements over other constructions which might be physically capable of use in the environments stated.

An embodiment of the invention is illustrated in the accompanying drawings, wherein—

Figure 1:
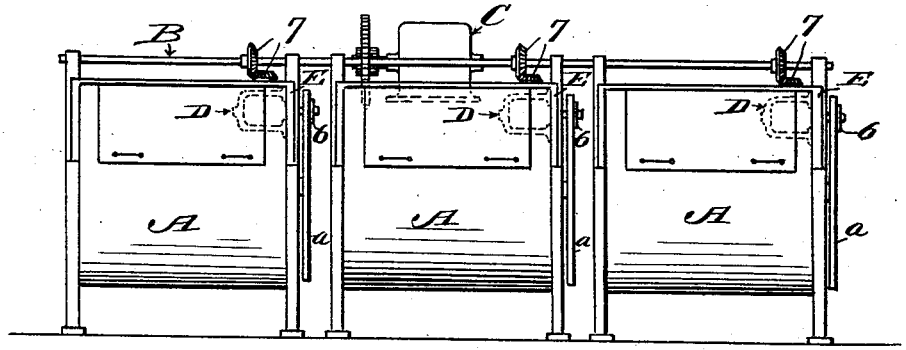
Figure 2:
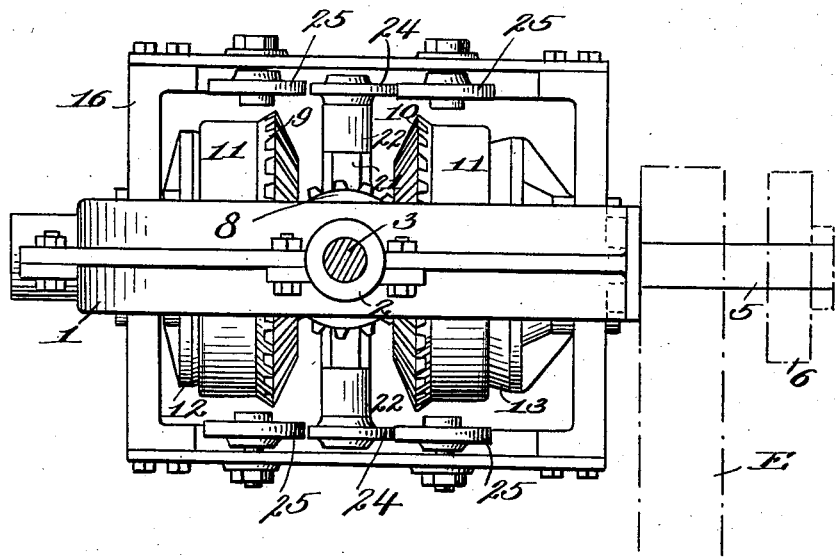
Figure 3:
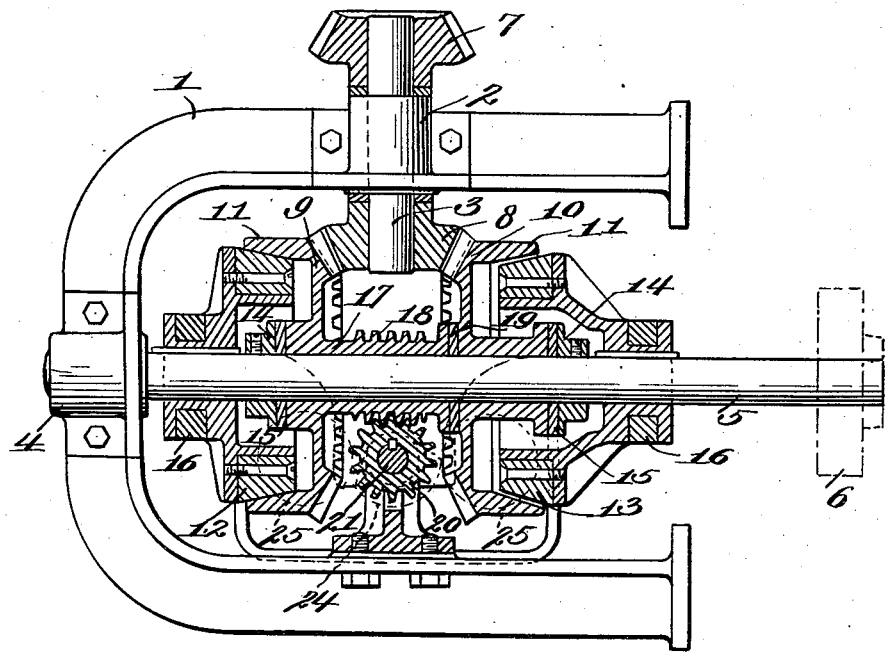
Figure 4:
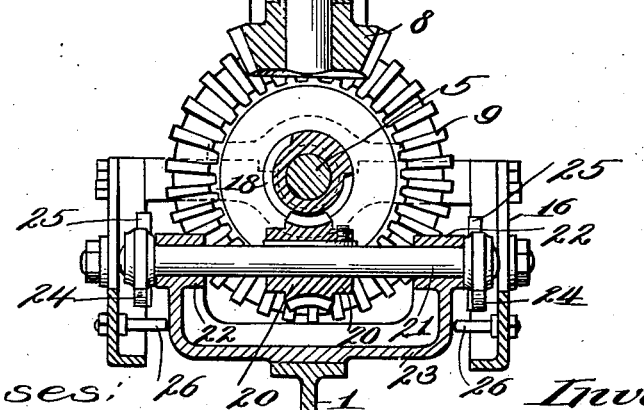

Figure 1 is a front elevation of a gang of machines showing diagrammatically the application of the present improvements thereto; Fig. 2 is a plan view of the improved transmission gearing; Fig. 3 is a vertical longitudinal sectional view thereof; and Fig. 4 is a vertical transverse sectional view thereof.

Similar characters of reference designate corresponding parts throughout the several views.

In the said drawings, as in those of my prior patent first referred to, the invention is illustrated as applied to a gang of washing machines, although such application, while peculiarly advantageous, is not obligatory. These machines are arranged in tandem and are generally designated by the letter A. They are driven, as hereafter described, from the main shaft B, which, in turn, is driven continuously in one direction from the motor C through the agency of suitable interposed gearing. An individual and unitary reversing gear connection is interposed between the shaft B and each machine. These reversing gear connections, which shall hereafter, for the sake of convenience, be referred to as "transmission units," are generally designated by the letter D and form the subject of the present invention.

The frame of each machine A has one of its side members E extended to the rear of said machine to furnish support for a corresponding transmission unit D and the operating parts of each unit are assembled with respect to a U-shaped frame 1 which is disposed in a vertical plane and which projects laterally from the member E to which it is secured.

The upper bar of the frame 1 has a sleeve bearing 2 for a vertical shaft 3 and the end bar of the frame 1 has a bearing 4 for a horizontal shaft 5. The shaft 5 is driven alternately in opposite directions from the shaft 2, in a manner to be hereafter explained, and in turn serves to drive the operating parts of the machine A through the agency of a pinion 6 provided on the shaft 5 and a large spur wheel *a* provided on the main shaft of the machine A. In this connection, it may be noted that the shaft 5 has support in the bearing 4 aforesaid, and also in the member E, and that the shaft is extended at the opposite side of said member, the extended portion of the shaft carrying the pinion 6.

The shaft 3 is driven from the shaft B, for example, by bevel pinions 7. The driving connections between the shafts 3 and 5 include a bevel pinion 8 mounted upon the inner end of the shaft 3; opposed larger bevel pinions 9 and 10 loosely surrounding the shaft 5 and having upon their outer sides annular flanges 11 constituting friction clutch rings; and friction clutch members 12 and 13 arranged to engage the rings 11 of the respective corresponding pinions 9 and 10 and slidably keyed on the shaft 5. The clutch members 12 and 13 have axial sliding movement and the arrangement is of such nature that when one of the clutch members, 12 or 13, as the case may be, is in engagement with its corresponding ring 11, the other clutch member is out of engagement with its corresponding ring 11. The friction clutch construction shown, while preferred, is, of course, not obligatory. As shown, the rings 11 have their inner faces flaring and the members 12 and 13 have their circumferential faces tapering in conformity to the flaring faces of the rings 11. The pinions 9 and 10 are held against axial movement or play by means of collars 14 fixed on the shaft 5 and between which and the hubs of the adjacent pinions antifriction rings 15 are interposed. The clutch members 12 and 13 are carried by a reciprocatory horizontal frame 16. The frame 16 is of rectangular outline and has support from the shaft 5. The end bars of the frame 16 are formed as retaining bearings for the hubs of the members 12 and 13 as clearly shown in Figs. 3 and 4.

The connections for reciprocating the frame 16 are of the following construction. The pinion 9 is formed with an axially and inwardly extending sleeve 17 upon which is formed a worm 18, and between which and the hub of the pinion 10 an antifriction ring 19 is interposed. The worm 18 meshes with and drives a worm wheel 20 which is fixed upon a transverse shaft 21. The shaft 21 is arranged below the shaft 5 and between the pinions 9 and 10, and its end portions are journaled in bearings 22. The bearings 22 are provided at the ends of a U-shaped bracket 23 which is supported upon and fixed to the lower leg of the frame 1 and extends transversely of said frame. The shaft 21 carries upon its ends cams 24 which coöperate with rollers 25 or their equivalent, which are arranged in pairs, one at each side of a corresponding cam. The side bars of the frame 16 preferably have depending U-shaped central portions, (shown in dotted lines in Fig. 3), and the rollers 25 are mounted upon studs or bolts which are carried by said central portions.

To prevent the frame 16 from tilting with respect to the shaft 5 as an axis, the side bars of said frame are provided midway of their length with one or more inwardly projecting pins 26, which engage against the sides of the bracket 23.

The operation will be readily apparent from the foregoing description. The shaft 3 and the pinion 8 constitute a common direct driving means for the pinions 9 and 10, producing continuous rotation of the latter in relatively opposite directions. The worm 18 turns with the pinion 9 and rotates the worm wheel 20 and therewith the shaft 21 and the cams 24. The latter alternately engage the opposed rollers 25 and thereby cause rectilinear reciprocations of the frame 16. The latter, as a consequence of its reciprocatory movement, produces the engagement of the clutch members 12 and 13 whereby the shaft 5 is driven alternately in opposite directions by the respective pinions 9 and 10.

It may be noted that the present construction, while securing the particular advantages enumerated in the third paragraph of this specification, also preserves the various advantages set forth in my said Letters Patent No. 951055, in connection with the construction therein shown.

It is to be understood that words descriptive of direction and position are used in a relative and not in an absolute sense.

Having fully described my invention, I claim:

1. In transmission gearing of the type set forth, two oppositely rotatable bevel gear wheels having at their outer sides friction clutch surfaces, common direct driving means for said bevel gear wheels, a worm arranged between the gear wheels and associated with one of the gear wheels to rotate therewith, a shaft passing loosely through the gear wheels and driven alternately in opposite directions thereby, a friction clutch element slidably keyed on the shaft for engagement with each clutch surface, a reciprocatory member for producing the alternate engagement and disengagement of said elements and the corresponding clutch faces, a worm wheel arranged between the bevel gear wheels and driven by the worm, a shaft extending transversely to said first named shaft and upon which the worm wheel is fixed, a cam fitted upon the transverse shaft, and means on the reciprocatory member at opposite sides of the cam for alternate engagement thereby to provide for the reciprocation of the member by the cam.

2. In transmission gearing of the type set forth, a stationary vertically disposed frame, a vertical shaft journaled in the upper bar of the frame, a horizontal machine driving shaft journaled in an end bar of the frame, a bevel gear wheel provided at the inner end of the vertical shaft, opposed bevel gear wheels driven by said first named gear wheels and loosely mounted upon the machine driving shaft, the opposed gear wheels having at their outer sides friction clutch faces, a friction clutch element slidably keyed on the machine driving shaft for engagement with each clutch surface, a reciprocatory member for producing the alternate engagement and disengagement of said elements and the corresponding clutch faces, a worm arranged between the opposed gear wheels and associated with one of said gear wheels to rotate therewith, a worm wheel arranged between the opposed gear wheels below the machine driving shaft, a shaft extending transversely to the machine driving shaft and upon which the worm wheel is fixed, a cam fitted upon the transverse shaft, and means on the reciprocatory member at opposite sides of the cam for alternate engagement thereby to provide for the reciprocation of the member by the cam.

3. In transmission gearing of the type set forth, a stationary vertically-disposed frame, a vertical shaft journaled in the upper bar of the frame, a horizontal machine driving shaft journaled in an end bar of the frame, a bevel gear wheel provided at the inner end of the vertical shaft, opposed bevel gear wheels driven by said first-named gear wheel and loosely mounted upon the machine driving shaft, the opposed gear wheels having at their outer sides friction clutch faces, a friction clutch element slidably keyed on the machine driving shaft for engagement with each clutch surface, a reciprocatory rectangular horizontal frame having its end bars formed as bearings for the friction elements, a worm arranged between the opposed gear wheels and associated with one of said gear wheels to rotate therewith, a worm wheel arranged between the opposed gear wheels below the machine driving shaft, a shaft extending transversely to the machine driving shaft and upon which the worm wheel is fixed, a U-shaped transversely-disposed bracket secured to the lower bar of said stationary frame and supporting said transverse shaft, cams provided at the ends of the transverse shaft, and rollers provided at each side of the reciprocatory frame and at opposite sides of the cams for alternate engagement thereby to provide for the reciprocation of said frame by the cams.

4. In transmission gearing of the type set forth, a stationary vertical frame, a transverse U-shaped bracket supported in the lower bar of said frame, a vertical shaft journaled in the upper bar of said frame, a horizontal machine driving shaft journaled in an end bar of said frame, a horizontal rectangular reciprocatory frame which is supported from the machine driving shaft, the latter being disposed longitudinally central of the reciprocatory frame, inwardly projecting pins provided at opposite sides of the reciprocatory frame to engage against said bracket, a bevel gear wheel provided on the inner end of the vertical shaft, opposed bevel gear wheels loosely mounted on the machine driving shaft and driven by said first-named gear wheel, the opposed gear wheels having at their outer sides friction clutch faces, friction clutch elements for alternate engagement with corresponding clutch faces and rotatably associated with the end bars of said reciprocatory frame, a transverse shaft arranged under the machine driving shaft and supported by the bracket, a worm wheel fixed on the transverse shaft, a worm arranged between the opposed gear wheels and associated with one of said wheels for rotation therewith, the worm driving the worm wheel and the transverse shaft, cams provided on the ends of the transverse shaft and rollers provided on the side bars of the reciprocatory frame at opposite sides of the cams for alternate engagement thereby.

In testimony whereof I have hereunto set my hand in presence of two subscribing witnesses.

PRENTICE E. CLARK.

Witnesses:
LAWRENCE L. ZERLE,
HANNA FLORENTINA.

---

Copies of this patent may be obtained for five cents each, by addressing the "Commissioner of Patents, Washington, D. C."